United States Patent [19]

Goldsworthy et al.

[11] Patent Number: 5,319,901
[45] Date of Patent: Jun. 14, 1994

[54] BIFURCATED COLUMN JOINT SYSTEM FOR ELECTRICAL TRANSMISSION TOWER

[76] Inventors: W. Brandt Goldsworthy, 2504 Novato Pl., Palos Verdes Estates, Calif. 90274; David W. Johnson, 1884 Sunset Blvd., San Diego, Calif. 92103; George Korzeniowski, 4210 Woodcliff Dr., Sherman Oaks, Calif. 91403

[21] Appl. No.: 7,079

[22] Filed: Jan. 21, 1993

Related U.S. Application Data

[63] Continuation-in-part of Ser. No. 715,912, Jun. 14, 1991, Pat. No. 5,247,774, and Ser. No. 808,499, Dec. 17, 1991, Pat. No. 5,218,129.

[51] Int. Cl.$^5$ .......................................... E04H 12/02
[52] U.S. Cl. ............................ 52/651.02; 52/651.03; 52/651.09; 403/263; 403/231
[58] Field of Search ............... 403/230, 231, 263, 169, 403/171, 176, 217, 263, 231; 52/651.02, 651.03, 651.09

[56] References Cited

U.S. PATENT DOCUMENTS

| | | | |
|---|---|---|---|
| 12,842 | 8/1908 | Noyes | 52/651.09 |
| 1,057,216 | 3/1913 | Bowman et al. | 52/651.02 |
| 1,917,594 | 7/1933 | Marshall | 52/651.02 |
| 2,186,190 | 7/1938 | Bauer | 403/171 |
| 4,027,855 | 6/1977 | Lauzier | 403/263 |
| 4,477,201 | 10/1984 | Yoshiyuji | 403/231 |
| 4,803,819 | 2/1989 | Kelsey | 52/309.1 |

FOREIGN PATENT DOCUMENTS

| | | | |
|---|---|---|---|
| 2415743 | 10/1975 | Fed. Rep. of Germany | 52/651.02 |
| 673128 | 1/1930 | France | 403/263 |

Primary Examiner—Carl D. Friedman
Assistant Examiner—Christopher Kent
Attorney, Agent, or Firm—Ralph S. Branscomb

[57] ABSTRACT

A column and beam joint system is used to make possible the construction of a large tower such as an electrical transmission tower, which has at least three and probably four corner legs or columns which are interconnected and supported by a lattice structure of cross members. The columns have specialized channels extending substantially their full lengths and the cross members have specialized locking ends which lock into retaining structure defined in the channels, permitting braces to be inserted and locked in place at any selected point along the channel. A technique for connecting a cross member brace between a column and another cross member is also disclosed. All of the principle parts of the tower are pultruded composites which are either used in their longitudinally extended form or sectioned as required by the application. The entire tower can thus be formed of pultruded composites without the use of metal fasteners or connecting structure, enabling the tower to be made smaller and more compact, thus reducing induced EMF around the base of the tower.

33 Claims, 3 Drawing Sheets

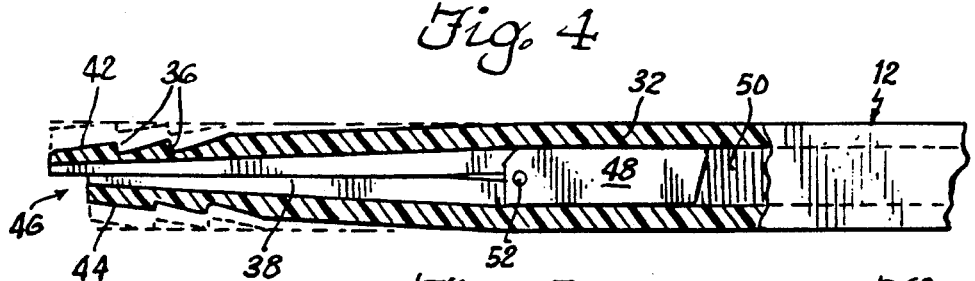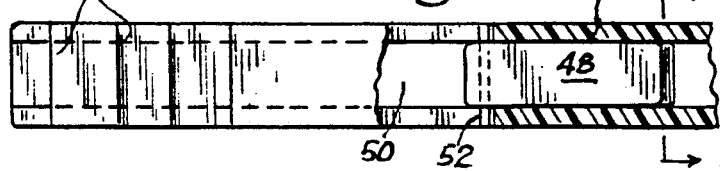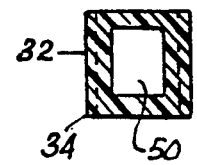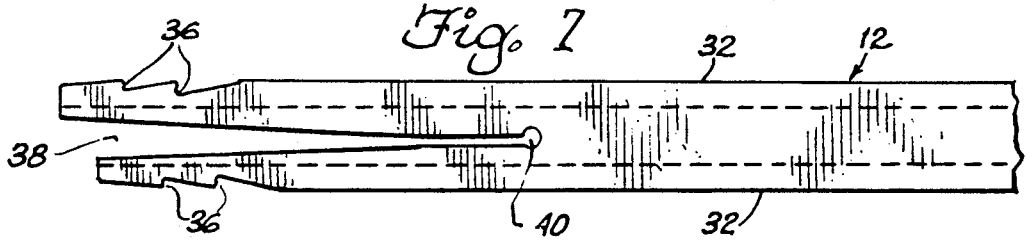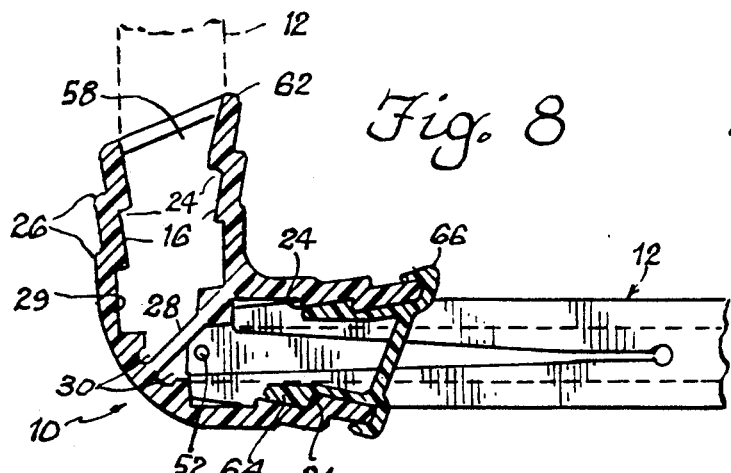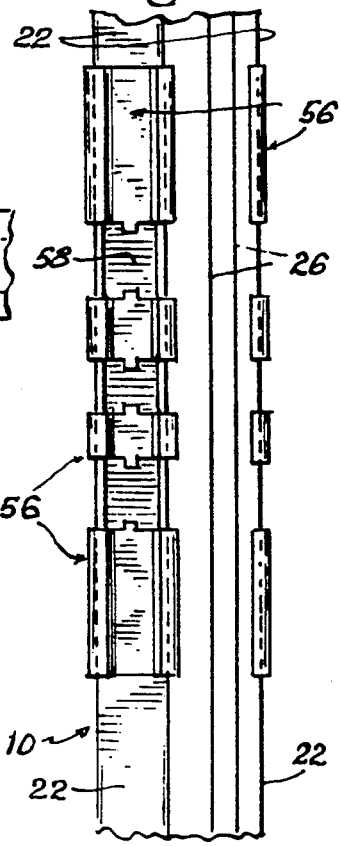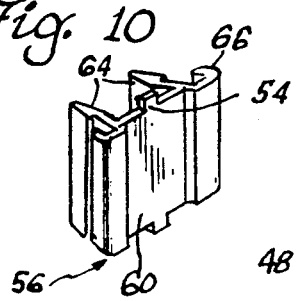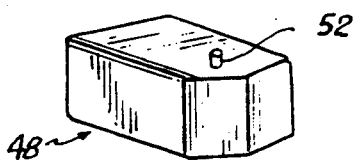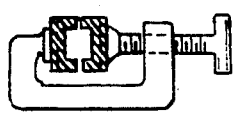

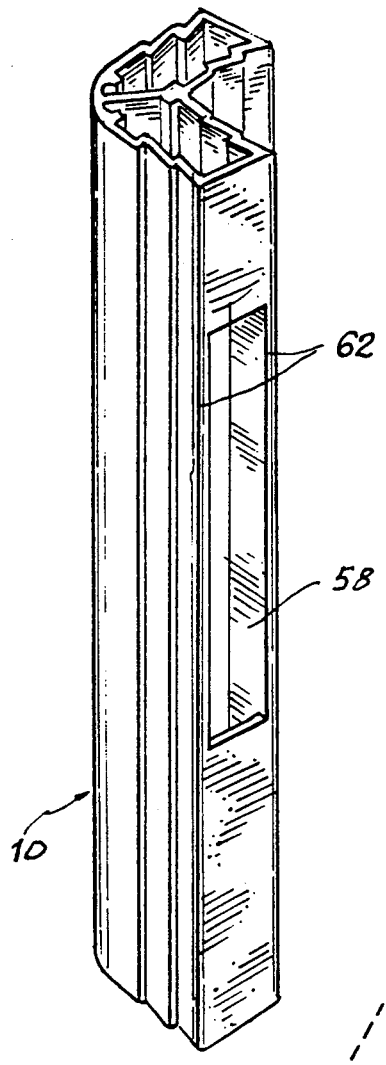
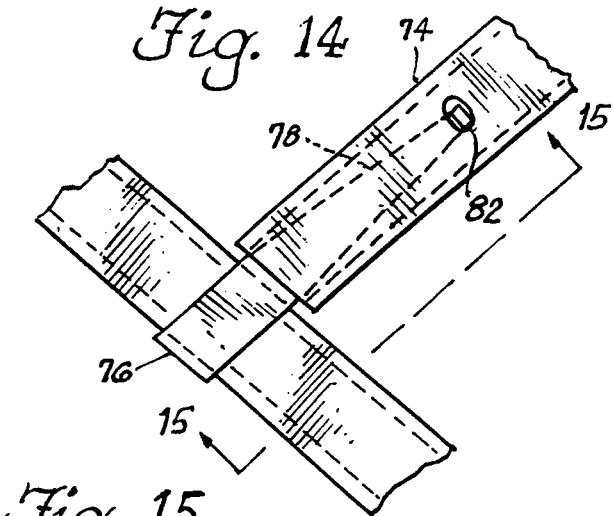
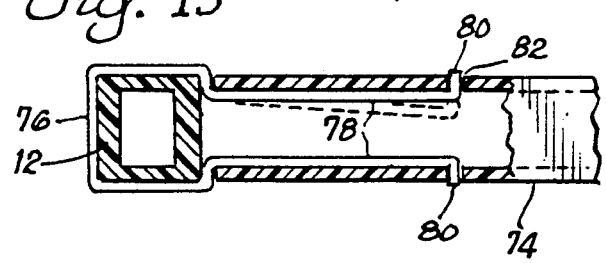
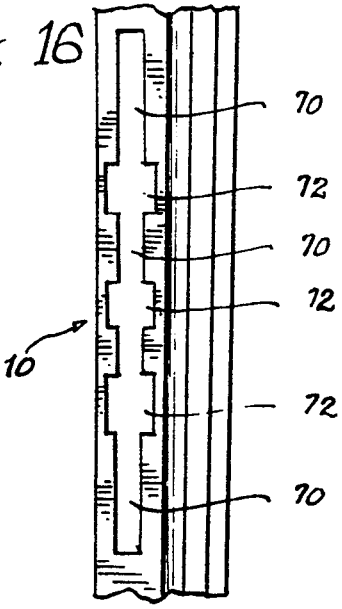
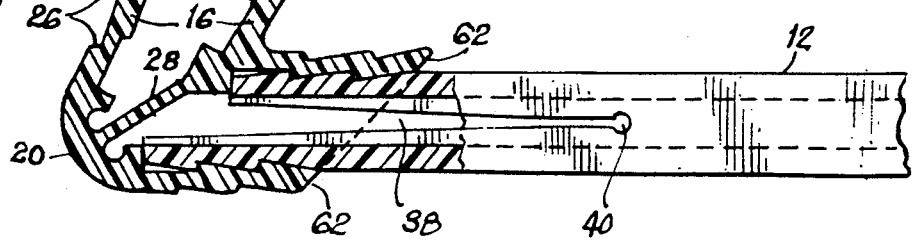

BIFURCATED COLUMN JOINT SYSTEM FOR ELECTRICAL TRANSMISSION TOWER

The present invention is a continuation-in-part of application Ser. No. 715,912 filed Jun. 14, 1991 now U.S. Pat. No. 5,247,774 for a TOWER CONSTRUCTION OF PULTRUDED COMPOSITES invented by David W. Johnson, and application Ser. No. 808,499 filed Dec. 17, 1991 now U.S. Pat. No. 3,218,129 by David W. Johnson and W. Brandt Goldsworthy for a JOINT SYSTEM AND TOWER MADE THEREWITH.

BACKGROUND OF THE INVENTION

The first patent application referenced above dealt with the use of pultruded composites generally with the construction of an electrical transmission tower. In the background of that disclosure is detailed the advantages of using pultruded composites as a replacement for steel in such a tower. These advantages result from physical, chemical, dielectric and electromagnetic properties of composite materials, which as used here refer to glass fibers woven into cloth which is drawn through a resin bath of polyester, vinylester, epoxy, or a thermoplastic such as polypropolene or polycarbonate, and then a die. A multiple-ply schedule is virtually always used.

The physical properties of composites that make it advantageous for use in electrical transmission towers are relatively high strength-to-weight ratio. However, it's low modulus of elasticity relative to steel requires that vertical support members and other structures be designed more creatively than is necessary with steel to mitigate the tendency of columns to buckle. Properly designed however, the tower structure is as strong or stronger than a tower of the same weight or cost made from steel.

Chemically, composites will resist corrosion and bacterial action indefinitely. They can be tailor-made to virtually any specifications depending on the application. Resistance to saltwater, ultraviolet light and virtually any destructive force can be designed into the composite.

The tower disclosed could be used for microwave, radio, or even windmill support, however, it is from the dielectric and electromagnetic perspectives that composites provide the greatest attraction in high voltage power line transmission towers. The high dielectric strength of glass composites and their low electrical conductivity make them much safer for repairmen, especially if the weather is inclement. When steel towers are maintained, there is a constant danger of flashover from a transmission wire to the steel tower structure. Wire grounding to the tower body may also be caused by a conductor being thrown across a tower structure in a storm. The steel construction aggravates many of the safety problems inherent in supporting high voltage power lines in the range of 115 kv. and higher.

An additional and unexpected advantage of composites over steel lies in the ability to bring the wires closer together due to the absence of the grounded conductive steel frame. Because the wires are out of phase with regard to the next closest wire or wires, the different phases will act to partially cancel out the electromagnetic field of adjacent wires and reduce the EMF at ground level. The closer the wires are together, the more cancellation of out-of-phase wires is exhibited.

By reducing EMF by bringing the conductors closer together, the tower can be made substantially smaller, with the highest conductors being substantially closer to the ground. This compaction reduces the widths of the right-of-way that must be purchased by the power authority to install the transmission towers. Currently, right-of-way purchase represents one of the major financial obstacles to electrical service expansion. This not only includes installation of new transmission lines but increasing the power capabilities of older lines. If a wider right-of-way must be purchased for a higher voltage transmission line due to ground level EMF regulations or just engineering standards, the cost may be prohibitive. However, using the tower described in this disclosure, of the same voltage class as the prior steel tower, a higher power transmission level can be achieved without expanding the right-of-way.

As discussed in one of the parent patents to this invention, the principal perennial problem with composites when used as structural members lies in the difficulty of forming joints. Steel is drilled, bolted and requires little imagination. Two steel beams or braces drilled and bolted together, or welded together, define a strong joint if done properly. The same techniques applied to composites will sever the continuous fibers which give the longitudinal fiber material its strength, and greatly weaken the structure at the joints. Therefore, steel is much simpler to use and currently structural engineers had steel construction emphasized in engineering school and in their professions and are generally entrenched in steel.

The need has thus presented itself to develop virtually innumerable new techniques for joining structural members of various sizes and configurations to withstand compression, sheer, and tension forces.

Although in the prototype stage substitution of composite structural members is more expensive than merely replicating steel configurations of the past, once the design has been perfected, pultrusion machines can run day and night with very little supervision, producing continuous elongated members having surprisingly complex cross-sections. Because the pultrusion process in its present state cannot create pultrusions of diverging or otherwise changing cross sectional configurations over the length of the piece, and thus cannot be strengthened at joint areas in the pultrusion process, connecting members together presents a challenge requiring considerable creativity.

The second-mentioned parent case to this invention tackled the problem of joining members of a large tower by the use of specially configured corner columns having slots which received specially designed cross members. That general concept is followed in this disclosure. The parent application used the low modulus of elasticity inherent in composite construction to create an internal slot or channel in the main support columns with deflecting detentes which received inserted ends of cross members having a mating detente configuration. When the cross members were inserted into the main slots of the columns, they locked in place. The column itself had internal partitions which yielded or expanded to admit the ends of the cross members.

In the instant disclosure, it has been determined that for the integrity and maximized strength of the columns, which will take the compressive loads of the tower, the columns should not define structural parts which yield to the insertion of cross members.

SUMMARY OF THE INVENTION

The invention of the present disclosure is at its core a reversing of the interlocking technique used in the second-mentioned parent application. In this invention, the columns each define cross member-seating channels and the cross members have a specialized end configuration to seat in the channels. But instead of the side walls of the column channels yielding to the insertion of the cross member ends, the channel walls are rigid and substantially unyielding and it is the ends of the cross members which compress to permit their insertion into the channels. This is achieved by bifurcating ends of the hollow cross members, taking advantage of the low modulus of elasticity of the glass composite construction. The two tines created by the bifurcation of the ends of the cross members can be compressed together to the point at which insertion into the column channel is possible. This is ordinarily done by clamping and compressing the two tines together. Once inserted into the channel and released, the tines return to their initial position at which point sawtooth detentes defined on the lateral side walls of the tines engage corresponding sawtooth structure on the inner side walls of channel. Not included in this disclosure is a proprietary ply schedule for both the channel side walls and the walls of the cross members which provides exceptional structural performance for this design.

With this basic construction technique, the tower can be constructed virtually in its entirety. Three or four corner columns each having two cross member-mounting channels extending longitudinally for the entire length of the columns define the corner legs of the tower. Each of the columns directs its two channels at the next adjacent columns and cross members extend between next adjacent columns both orthogonally and diagonally. The channels can receive cross members at any reasonable angle provided that the cross member lies within the respective side plane defined by two next adjacent columns.

These structural members will form a virtually complete tower without any other structure, other than wedge blocks for locking the tines in place and cover plates for uncovered window portions of the column channels. If additional reinforcement is required for a cross member having a long span length, a brace cross member is used which inserts into a channel at one end and has a cross member-encircling mounting strap at the other to define a brace butt joint with the cross member needing support.

BRIEF DESCRIPTION OF THE DRAWINGS

FIG. 4 is a longitudinal section taken through the seating end of a cross member illustrating the tines in their compressed mode and the wedge block and it's non-locked mode;

FIG. 5 is a side elevation view of the seating end of the cross member of FIG. 4;

FIG. 6 is a section taken along line 6—6 of FIG. 5;

FIG. 7 is a top plan view of the seating end of a cross member;

FIG. 8 is a section taken through a column and a seated cross member end with the wedge block and cover plate in place;

FIG. 9 is an elevation view of a column illustrating a typical cover plate configuration with the cross members removed for clarity and shown in phantom in plan view;

FIG. 10 is a perspective view of a cover plate having two wedge block-stopping tabs;

FIG. 11 is a perspective view of a wedge block;

FIG. 12 illustrates the clamping manner in which the two tines of the seating end of a cross member are compressed together;

FIG. 13 is a perspective view of a column illustrating a long channel access window;

FIG. 14 is a detail of construction taken from the area indicated at 14—14 of FIG. 1;

FIG. 15 is a section taken along line 15—15 of FIG. 14;

FIG. 16 is an elevation view of a modified form of the elongated window shown in FIG. 13; and, FIG. 17 is a form of the column in which the two cross member-receiving channels are oriented sixty degrees apart to form a tower which is triangular in cross section and has three legs.

DETAILED DESCRIPTION OF THE PREFERRED EMBODIMENTS

Figure 2:
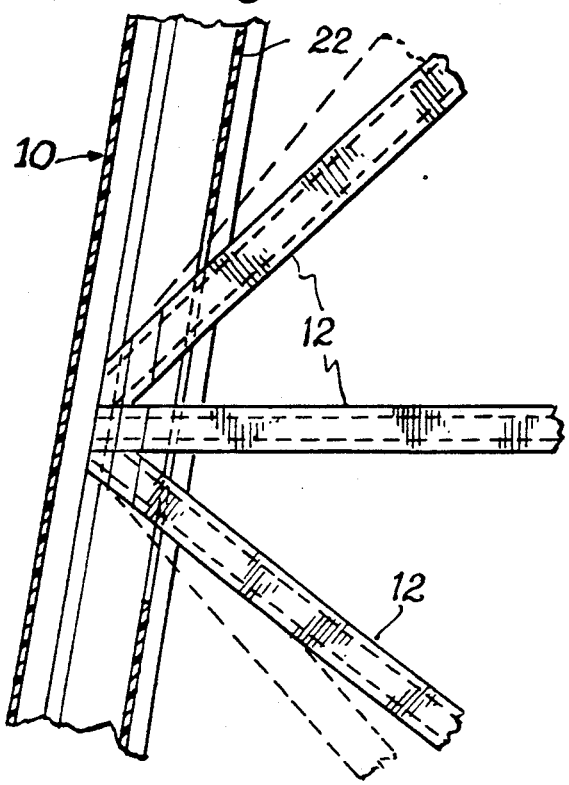
FIG. 2 is a diagrammatic vertical section through a column illustrating three cross members converging in the column channel as referenced on FIG. 1 at 2—2.
Figure 1:
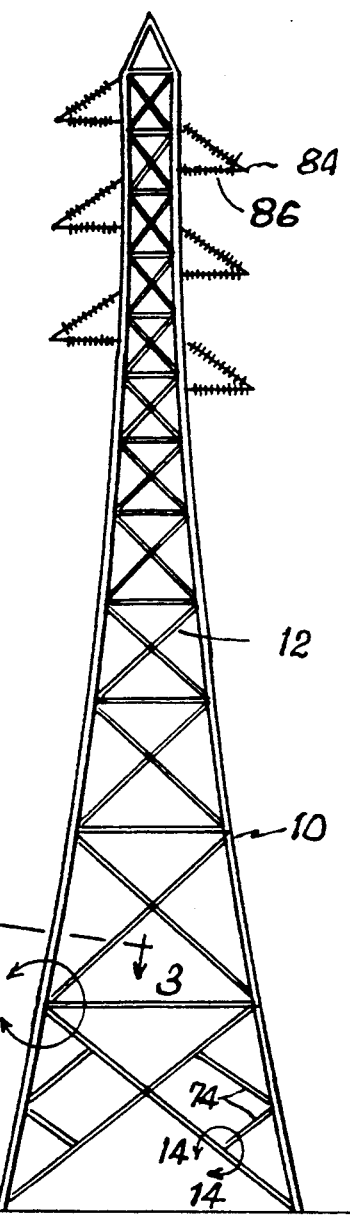
FIG. 1 is a somewhat diagrammatic side elevation view of a tower made according to the instant invention.

There are four basic parts, including two major parts and two minor parts, which are used to construct the entire tower shown in FIG. 1, absent the insulated wire suspension rods supported at the top of the tower. The two principle components are the column 10 and the cross member 12 shown in the overall completed construction in FIG. 1. The configuration of the first (of 2) embodiment of the column is best seen in FIG. 13, and also 3 and 8. The column is a single, continuous pultrusion. Its cross section is necessarily uniform. All of the features defined on any segment of the column are necessarily found at any other segment of the column longitudinally displaced from the first. This is advantageous in that the column by nature has cross member mounting structure at any point along its length.

The principle structural features of the column are its two channels 14. These channels have side walls 16 which are generally parallel to one another for each channel, and in the illustrated embodiment are covered at their outer ends with a skin 18 which is continuous around the column, taking the form of the side walls and the curved back portion 20 and the channel-covering surfaces 22 so that the complete column member is enclosed.

Each of these channels defines retaining structure for the inserted seating end of one of the cross members 12 which butts into the column. In the illustrated embodiment this retaining structure takes the form of sawtooth detentes 24 which complement oppositely-oriented sawtooth detentes formed on the lateral side walls of the seating ends of the cross members. The two mating sets of sawteeth define a uni-directional insertion path into the respective channel.

Figure 3:
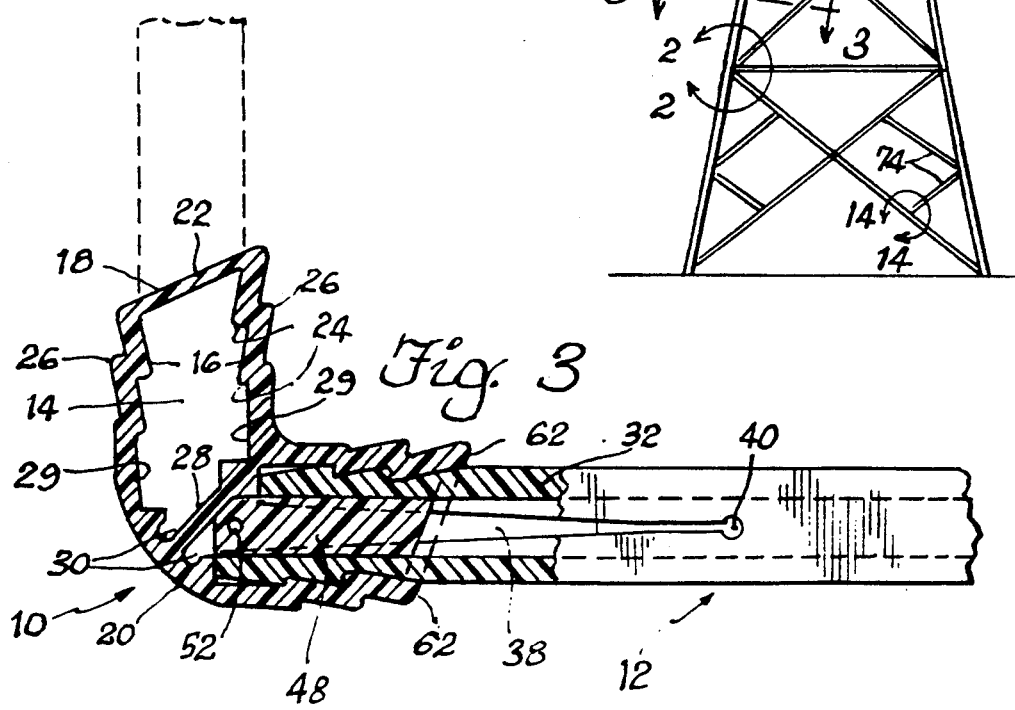
FIG. 3 is a cross section taken along line 3—3 of FIG. 1.

As can be clearly seen in FIG. 3, the side walls of the channels define the sawtooth detentes on the inside and corresponding undulations on the outside so that the thickness of the channel side walls is more or less uniform. This configuration is also the most straightforward manner of creating the channel side walls as a uniform ply schedule, that is, as a fixed number of layers of fiberglass cloth, which can be pultruded into the undulating shapes shown in the figures which created design lines externally and detente structure internally of the channels.

A reinforcing web 28 forms the inner ends of the channels. Lands 29 are designed to specifically allow compression through the end walls of any cross member 12. The small conduit channels 30 (which are not intended to be indicated when the term "channel" is used as this refers to main channels) are formed in the pultrusion to make space for ground wires or fiber optics cables which may be incorporated in the finished tower. These conduit channels keep any wires or cables hidden from sight and out of the weather.

Turning to the cross members 12, each cross member begins as a section cut from a pultruded composite having a cross section indicated in FIG. 6, with lateral side walls 32 being thicker than the adjoining side walls 34 so that these thicker side walls can be machined after being pultruded to define locking means for engaging the retaining means of the column channel. The locking means that is disclosed takes the form of the complimentary sawtooth detentes 36 which mate with the channel sawtooth detentes 24 when the joint is assembled. The thicker lateral side walls permit machining the necessary grooves to form the sawteeth without unduly weakening the wall structure. Although cross member 34 is shown square as it was described in the parent application, it could be rectangular, C-shaped, or an I-beam, as long as the lateral sidewalls 32 are of the same outside width dimensions to seat in the column channels.

In addition to the sawteeth being machined into the lateral side walls of the cross members, the ends, or one end of any cross member which is to be butted into a column is bifurcated as shown in FIG. 7, forming a deep, converging groove 38. This groove terminates at an expanded terminal end 40, and diverges outwardly to its widest point at its seating end. The two tines 42 and 44 defined by this bifurcation are cut to different lengths corresponding to different depths of insertion permitted by the column channel geometry shown in FIG. 8. The channel side walls on the acute angle side of the column extend further along the cross member than do the outer side walls, but the side walls each engage approximately the same length of cross member surface. This results in efficient use of materials as optimum cross member support is achieved by engaging substantially the same length of the lateral side walls. Extending the outer side wall so that they are square with the inner side walls would not be as efficient as extending both of them equally if additional support were needed.

The shape of the bifurcation 38 is such that the two tines 42 and 44 may be compressed together as indicated in FIG. 4 and clamped as shown in FIG. 12 in the compressed position. The sides of the V-shaped bifurcation will then lie substantially parallel and flush against one another as shown in FIG. 4. In this configuration the seating end 46 of the cross member is adequately narrowed so that it can be inserted into one of the column channels as shown, after release of the clamp, in FIGS. 3 and 8. The low modulus of elasticity of the glass fiber composite used to make the cross members creates ideal resilient, springy tines that will compress together and then return to engage the inner sides of the channel side walls with considerable rigidity.

The cross member as defined above would create a butt joint with the column that would be adequate for many purposes. However, to maximize the strength and rigidity of this joint ideally a wedge block 48 or the equivalent would be used to positively lock the tines in their outward orientation and prevent their collapse once they have been seated as shown in FIGS. 3 and 8. The block is dimensioned to occupy substantially the entire cross section of the interior corridor 50 formed in the hollow cross member. Thus when pushed down to the tip of the seating end of the cross member no converging displacement of the tines would be permitted.

Optimally there would be two restraints imposed upon the block. First, if it were a simple block free to slide within the corridor 50 it would be constantly sliding back into the central area of the cross member and could not be reached to slide it between the tines. To avoid this a slide pin 52 projects from the block. This slide pin is positioned so that it rides in the bifurcation 38, with it's farthest position from the tines being engaged in the expanded terminal 40 of the bifurcation. This expanded portion accommodates the pin while the remaining portions of the bifurcation are compressed together eliminating the space between the tines as shown in FIG. 4. It might be convenient to use two oppositely directed pins although one is adequate. The block is not required to exhibit great strength qualities and could be made from a number of materials, but is most conveniently produced as a segment of a pultruded composite with the pin or pins 52 being inserted in a hole drilled into or through the block.

The other constraint that is necessary or desirable to impose on the block is to keep it in its wedging mode between the tines once it is in place. There are dozens of ways to do this, with the illustrated embodiment using stop tabs 54. These tabs extend from the central portions of the cover plate 56 illustrated in FIG. 10. This plate is obviously intended to lie between two cross members such as shown in FIG. 9 and has a tab extending from each side to act as a stop for two blocks and two adjacent converging cross members.

Aside from their utility in forming a block stop tab, the cover plates are used to cover the portions of the long window 58 shown in FIG. 13 which are not occupied by cross members butted into the channel. The window would almost always be required to be much longer or taller than the space occupied by the cross member because it would have to accommodate the end of a cross member which is swung into place rather than being slid into place, since in the tower construction shown in FIG. 1 only the first-installed cross member end can be slid into place if the two columns between which the cross member spans are spatially fixed.

Thus even if only a single cross member were used, and the cross member square being 2 inches on a side, the window would still have to be 12–18 inches tall.

The cover plates of course cover these otherwise exposed window portions and seal off the internal channel from the outside. As shown in FIG. 10 the cover member has a central web 60 which aligns with the terminal edges 62 of the channel side walls 16 so that a flush surface with the adjoining skin above and below the central web is achieved. Locking means 64, similar to the sawtooth detentes 36, snap into engagement with the retaining structure of the channel as shown in FIG. 8. The extended detentes defining the locking structure compress together when inserted into the channel. An optional feature of the cover plate is the use of the curved laterally-directed lips 66 which lock around the outsides of the side walls to prevent their separation.

Offsetting this advantage is the fact that these lips of necessity create a discontinuity in the otherwise smooth exterior contour of the column. As shown in FIG. 9, of course the cover plates will need to be made of different lengths, and having one or two tabs to accommodate the portions of the window that need covering. The cover plates could be pultrusion sections with the tabs machined into the cutoff of each plate.

An optional form of the window is shown at 68 in FIG. 16. This window is not rectangular but has lengths of reduced diameter as indicated at 70 where the cross member is inserted but does not finally rest, with the final resting positions having expanded areas 72. This configuration may be economically undesirable but does serve to minimize the erosion of strength at the window area of the column. The window of FIG. 16 corresponds to the three-cross member joint of FIG. 9, so that the top and bottom expanded openings 72 are taller than the center opening to accommodate the diagonal cross section of the diagonal cross members.

A further optional form of the window would be to create a column with an portion 18 on either channel. In this way both channels would be continuously open, would not require machining, and cover plates would be optional.

The tower shown in FIG. 1 has four corner columns, that is four columns which would appear in the corners of any transverse section of the tower. A structure having a different number of columns such as 3,5, or 6 or more could be made with obvious modifications. The column whose cross section is shown in FIG. 17 has a 60-degree angle between the planes defined by the two channels and is adapted for use in forming three-legged tower structures.

Referring again to FIG. 1, the top portion of the tower is made completely according to the six-cross-member joint construction shown in FIG. 9. Toward the lower end of the tower the span lengths of the cross members and columns become so great that it becomes necessary to use braces 74, which are another form of cross member in which one end is a seating end which is identical to the other cross members, but the other end does not seat in a channel of the column but rather is a brace joint end.

An appropriate means of joining the brace joint end to a midsection of a cross member is shown in FIGS. 14 and 15. A rigid strap 76 encircles the mid section of the cross member. The extending ends 78 of the strap insert into the open end of the brace and outwardly directed tabs 80 at the tips of the strap ends deflect into detente apertures 82 defined in the brace. As shown in FIG. 14, the meeting of the brace with the midsection of the cross member need not be orthogonal and in fact could be at any angle. In many circumstances either the channel-seating end of the brace or the other end will butt into its respective joining member non-orthogonally, making some type of non-rectangular connection necessary. The sawtooth detent structure at the end which seats in the column can be machined to any angle that is required, or the strap 76 could be made with a slightly wider encircling opening than necessary and then shimmed or wedged on both sides to define a snug coupling with the braced member for a range of different meeting angles.

Aside from the structure shown, in the event it is necessary to interface a column with a steel cross member or anything else that is not pre-formed into the appropriate seating configuration, an adaptor could be used which connects to the steel brace and inserts into the channel just as the seating ends shown in the drawings.

It is the intent of those designing these structures that the couplings be adequate without the use of adhesives, and especially without additional fasteners. Adhesives carry with them many inherent problems but there may be instances in which they would be beneficially used in the construction of the tower. Also, the tower columns as shown in FIG. 1 are not straight, although they could be, but defined in natural shallow arc which should be followed when engineering the lengths and angle cuts on the ends of the cross members at various heights along the tower.

It is the purpose of this invention to describe the construction of the tower itself. The attachments of the conductors which are connected at loci 84 defined by the ends of insulator rods 86, known as horizontal vees, may be done however is most appropriate. The configuration shown would require the insulator rods to be pivoted or hinged to the tower if current insulator configurations of this type are to be continued. The hinged insulator rods allow axial movement of the lines, as is typical of suspension insulators, to reduce stress on the conductor supports and the tower, as well as the wires themselves.

The tower of FIG. 1, using the construction detailed above, is smaller and lower in height than the steel tower used for the same voltage rating. In addition, this tower will not rust or corrode, will mitigate induced EMF at ground level around the tower, and will have high dielectric strength. The tower will last indefinitely. Longevity studies on such materials are incomplete because they do not generally extend beyond thirty years so there is no accurate way of predicting how much longer than that they will survive. There are many composite structures in existence that have survived for more than 30 years and show no signs of structural deterioration. It is easy to believe that towers made according to this disclosure may well last 50 to 100 years.

We claim:

1. A column and cross member system in which a pultruded composite column and at least one cross member are configured to couple together to define a joint, said system comprising:
   (a) a pultruded composite column having a longitudinal direction and defining a longitudinal internal seating channel extending substantially the entire length of said column and being open to the outside over a longitudinal length at least adequate to permit the insertion of the end of at least one cross member therein;
   (b) at least one cross member having at least one seating end insertable into said seating channel wherein same is open to the outside;
   (c) said channel defining cross member retaining structure along at least a portion of the length thereof to rigidly engage the seating end of a cross member butted into said channel;
   (d) said at least one seating end of said at least one cross member defining locking means cooperating with said retaining structure to insert into said channel and engage said retaining structure to define a rigid joint with said cross member butted into said column;

(e) said column and said at least one cross member being structural members and said seating end being compressible and said locking means comprising detente elements externally defined on said seating end and said retaining structure being defined in the lateral sides of said seating channel and said cross member and said channel are dimensioned such that said end must be compressed to enter said seating channel and when released expands such that said detente elements engage said retaining structure, and including means operative with said seating end to oppose compression thereof after same is seated in said channel.

2. A system according to claim 1 wherein said retaining structure and detente elements comprise complimentary sawtooth elements defining a uni-directional sliding action in the direction toward and normal to said column into said channel, and said complimentary sawtooth elements are defined on both sides of said channel as integral pultrusion contours of the pultruded column and extend substantially the entire length thereof and said seating end of said at least one cross member is bifurcated to define two laterally compressible tines having outer lateral side walls and the sawtooth elements are outwardly directed on said outer lateral side wall.

3. A column and cross member system in which a pultruded composite column and at least one cross member are configured to couple together to define a joint, said system comprising:
(a) a pultruded composite column having a longitudinal direction and defining a longitudinal internal seating channel extending substantially the entire length of said column and being open to the outside over a longitudinal length at least adequate to permit the insertion of the end of at least one cross member therein;
(b) at least one cross member having at least one seating end insertable into said seating channel wherein same is open to the outside;
(c) said channel defining cross member retaining structure along at least a portion of the length thereof to rigidly engage the seating end of a cross member butted into said channel;
(d) said at least one setting end of said at least one cross member defining locking means cooperating with said retaining structure to insert into said channel and engage said retaining structure to define a rigid joint with said cross member butted into said column;
(e) the seating end of said cross member being hollow to define an open-ended internal corridor bifurcated to produce two spaced mutually compressible tines having lateral side walls defining said locking means thereon such that said tines are compressed together to permit said seating end to be inserted in said channel, whereupon releasing said tines said locking means move into seated locking engagement with said retaining means, and including means operative with said seating end to prevent compression of said tines once seated in said channel.

4. A system according to claim 3 and including a wedge block slidably received in said corridor with means to effect the sliding of said wedge block into said seating end to prevent said tines from moving together, whereby column/cross member joint rigidity is maximized.

5. A system according to claim 4 wherein said means to effect the sliding of said wedge block comprises a pair of slots entrant from the seating end of at least one cross member, said slots resulting from the bifurcation of said seating end and said wedge block is accessible through said slots for moving same along said corridor in the direction of said seating end.

6. A column and a cross member system in which a pultruded composite column and at least one cross member are configured to couple together to define a joint, said system comprising:
(a) a pultruded composite column having a longitudinal direction and defining a longitudinal internal seating channel extending substantially the entire length of said column and being open over a longitudinal length at least adequate to permit the insertion of the end of at least one cross member therein;
(b) at least one cross member having at least one seating end insertable into said seating channel where same is open;
(c) said channel defining cross member retaining structure along at least a portion of the length thereof to rigidity engage the seating end of a cross member butted into said channel; and,
(d) said at least one seating end of said at least one cross member defining locking means cooperating with said retaining structure to insert into said channel and engage said retaining structure to define a rigid joint with said cross member butted into said column;
(e) said seating end of said cross member being hollow to define an open-ended internal corridor and being bifurcated to produce two spaced mutually compressible tines having lateral side walls defining said locking means thereon such that said tines are compressible together to permit said seating end to be inserted into said channel and upon releasing said tines said locking means move into seated locking engagement with said retaining means;
(f) a wedge block slidably received in said corridor with means to effect the sliding of said wedge block into said seating end to prevent said tines from moving together, maximizing column/cross member joint rigidity;
(g) said means to effect the sliding of said wedge block comprising a pair of slots entrant from the seating end of said at least one cross member, said slots resulting from the bifurcation of said seating end and said wedge block being accessible through said slots for moving same along said corridor in the direction of said seating end; and,
(h) said slots each having a terminal end at the opposite end of the respective slot from the entrant end and said block having at least one pin extending therefrom at a position to permit same to travel along one of said slots and catch at the terminal end of said one of said slots to prevent escape of said block into the central portions of said at least one cross member.

7. A system according to claim 6 and including means to stop said wedge block in a wedged position between said tines.

8. A system according to claim 7 wherein said means to stop said block comprises a tab to extend through one of said slots into said corridor between the terminal end of the respective slot and said block.

9. A system according to claim 8 wherein said tab extends from a cover plate mounted to said column to cover at least a part of said entryway.

10. A column and a cross number system in which a pultruded composite column and at least one cross member are configured to couple together to define a joint, said system comprising:
   (a) a pultruded composite column having a longitudinal direction and defining a longitudinal internal seating channel extending substantially the entire length of said column and being open to the outside over a longitudinal length at least adequate to permit the insertion of the end of at least one cross member therein;
   (b) at least one cross member having at least one seating end insertable into said seating channel wherein same is open to the outside;
   (c) said channel defining cross member retaining structure along at least a portion of the length thereof to rigidly engage the seating end of a cross member butted into said channel;
   (d) said at least one seating end of said at least one cross member defining locking means cooperating with said retaining structure to insert into said channel and engage said retaining structure to define a rigid joint with said cross member butted into said column;
   (e) said channel having a cross member-receiving entryway side and said column defining an enclosing skin having at least one window at the entryway side of said channel to permit the insertion and seating of the seating end of said at least one cross member therethrough, said window being of longitudinal extent substantially greater than the corresponding end of a cross member seated in said channel to permit said cross member to be swung into place in said channel rather than longitudinally inserted, and said window being of longitudinal extent adequate to permit the seating of up to three cross members which converge in said channel as a central, orthogonally inserted cross bar with two diagonally inserted cross members on opposite sides of said orthogonally inserted cross bar, all three cross bars converging inside said channel.

11. A column and cross member system in which a pultruded composite column and at least one cross member are configured to couple together to define a joint, said system comprising:
   (a) a pultruded composite column having a longitudinal direction and defining a longitudinal internal seating channel extending substantially the entire length of said column and being open to the outside over a longitudinal length at least adequate to permit the insertion of the end of at least one cross member therein;
   (b) at least one cross member having at least one seating end insertable into said seating channel wherein same is open to the outside;
   (c) said channel defining cross member retaining structure along at least a portion of the length thereof to rigidly engage the seating end of a cross member butted into said channel;
   (d) said at least one seating end of said at least one cross member defining locking means cooperating with said retaining structure to insert into said channel and engage said retaining structure to define a rigid joint with said cross member butted into said column;
   (e) said channel having a cross member-receiving entryway side and said column defining an enclosing skin having at least one window at the entryway side of said channel to permit the insertion and seating of the seating end of said at least one cross member therethrough, said window being of longitudinal extent substantially greater than the corresponding end of a cross member seated in said channel to permit said cross member to be swung into place in said channel rather than longitudinally inserted, and including a cover plate dimensioned to cover any portion of said window unoccupied by cross members.

12. A system according to claim 11 wherein said cover plate has locking means for locking into the retaining means in said channel.

13. A system according to claim 12 wherein said channel has lateral side walls and said cover plate has lateral edges which curve around said channel at the edges of said chamber entryway to prevent separation of the lateral side walls of said channel.

14. A column and cross member system in which a pultruded composite column and at least one cross member are configured to couple together to define a joint, said system comprising:
   (a) a pultruded composite column having a longitudinal direction and defining a longitudinal internal seating channel extending substantially the entire length of said column and being open to the outside over a longitudinal length at least adequate to permit the insertion of the end of at least one cross member therein;
   (b) at least one cross member having at least one seating end insertable into said seating channel wherein same is open to the outside;
   (c) said channel defining cross member retaining structure along at least a portion of the length thereof to rigidly engage the seating end of a cross member butted into said channel;
   (d) said at least one seating end of said at least one cross member defining locking means cooperating with said retaining structure to insert into said channel and engage said retaining structure to define a rigid joint with said cross member butted into said column; and
   (e) said column and said at least one cross member being structural members and said channel being a first channel and comprising a substantially parallel-walled slot defining a plane parallel to the longitudinal dimension of said column, and including at least one additional channel substantially identical to said first channel and extending longitudinally in a direction parallel to the longitudinal direction of extension of said first channel.

15. A system according to claim 14 wherein said at least one additional channel is a channel defining a plane normal to the plane defined by said first panel.

16. A system according to claim 15 wherein said at least one additional channel is a channel defining a striking an angle of on the order of sixth degrees with the plane of said first channel with said angle being measured in a plane orthogonal to a direction of longitudinal extent of said channel.

17. A column and cross member system in which a pultruded composite column and at least one cross member are configured to couple together to define a joint, said system comprising:

(a) a pultruded composite column having a longitudinal direction and defining a longitudinal internal seating channel extending substantially the entire length of said column and being open to the outside over a longitudinal length at least adequate to permit the insertion of the end of at least one cross member therein;

(b) at least one cross member having at least one seating end insertable into said seating channel wherein said is open to the outside;

(c) said channel defining cross member retaining structure along at least a portion of the length thereof to rigidly engage the seating end of a cross member butted into said channel;

(d) said at least one seating end of said at least one cross member defining locking means cooperating with said retaining structure to insert into said channel and engage said retaining structure to define a rigid joint with said cross member butted into said column; and, said column defining channel side walls having inner and outer surfaces which are substantially parallel to one another following an undulating pattern that produces sawtooth ridges on the inner surfaces to define said retaining structure, and defining corresponding design lines on the outer surfaces whereby the wall thickness of each side wall is substantially uniform and comprises a substantially uniform ply schedule of fiber layers pultruded to result in the formation of said side wall.

18. A tower structure constructed in substantial part from pultruded composite members comprising:

(a) at least three spaced pultruded composite main longitudinal support columns defining transverse sectional corners of said tower;

(b) a plurality of cross members defining a support lattice for said columns and at least some of said cross members having at least one seating end terminating at one of said columns to form a butt joint;

(c) said columns each defining at least one longitudinally extended channel for receiving the seating ends of at least one butted cross member;

(d) said channels defining internal retaining means for engaging the seating ends of said butted cross members; and, (e) said seating ends having locking means which insert into and engage said retaining means in a respective one of said channels to define a locked joint, whereby said butted cross members can be inserted into a selected channel at any one of a plurality of possible positions therealong and locked in place to define a butt joint.

19. A system according to claim 18 wherein said seating ends are bifurcated to define two resilient mutually compressible tines with lateral side walls, and said locking means comprise cross members sawtooth detentes defined on said lateral side walls, said channels have inner substantially parallel side walls and said retaining means comprising channel sawtooth detentes which lock together with said cross member sawtooth detentes when a respective seating end is compressed to reduce the mutual tine spacing, inserted into a respective channel, and released.

20. A system according to claim 19 wherein said channel sawtooth detentes extend the substantial length of the respective column and are formed as continuous pultruded ridges formed by the column pultrusion die as the column was pultruded.

21. A system according to claim 19 wherein a substantial portion of said cross members comprise hollow pultruded composites having said cross member sawtooth detentes machined in the opposite lateral side wall of the seating ends subsequent to pultrusion.

22. A system according to claim 21 wherein said hollow pultruded cross members each define an internal hollow corridor and including a wedge block slidably received within said corridor, said wedge block being dimensioned to occupy substantially all of the cross section of said corridor such that sliding said block into said seating end into a locking position after seating in a channel locks said cross member in place and prevents compression of said tines.

23. A system according to claim 22 and including stop means for holding said block in said locking position.

24. A system according to claim 23 and including means to prevent escape of said block along said corridor beyond a predetermined distance from said seating end.

25. A system according to claim 18 wherein at least some of said butted cross members span between two of said columns and have two seating ends which lock in the respective channels of said two columns.

26. A system according to claim 18 wherein the two channels in each of said columns are mutually parallel in their directions of extension and the channels of each column are oriented such that they are laterally directed to the two next adjacent columns in the tower plan form configuration to seat butted cross members extending therebetween, and including respective butted cross members which seat in and span between every next adjacent pair of cross members in the tower plan form to define a rigid structure.

27. A system according to claim 26 wherein some of said cross braces extending from one seating end seated in one of said channels to a midportion of one of said cross members where it forms a brace butt joint therewith.

28. A system according to claim 27 wherein said braces are hollow pultruded composites having a seating end and an open hollow brace joint end, and including a strap encircling said midportion and having straps ends mounted to said brace joint end.

29. A system according to claim 28 wherein said strap is rigid and said strap ends insert into said open hollow brace joint end and are outwardly biased terminating in outwardly directed tabs, and the inside walls of said hollow braces define recesses into which said tabs lock to form a rigid brace joint.

30. A system according to claim 18 wherein some of said butted cross members are each diagonally oriented relative to the column in which it seats such that it lies in a side plane substantially defined by the column within which it seats and a next adjacent column.

31. A system according to claim 30 wherein some of said butted cross members are each substantially outwardly extended from the column in which it seats and lies in one of said side planes.

32. A system according to claim 18 wherein said columns each define peripheral skin defined in the column pultrusion process, and said skin covers said channels defined in the respective column, and including windows cut into said skin at cross member insertion points along said channel.

33. A system according to claim 32 wherein said windows are longitudinally oversized compared to the longitudinal portion of the window occupied by a cross member, and including cover plates having locking structure which inserts into a selected one of said channels to lock the respective cover plate in place.

* * * * *